United States Patent
Ogasawara et al.

(10) Patent No.: US 7,249,229 B2
(45) Date of Patent: Jul. 24, 2007

(54) SYNCHRONOUS MESSAGE QUEUES

(75) Inventors: Gary Hayato Ogasawara, Foster City, CA (US); Jonah Schwartz, Oakland, CA (US); David Stone, Union City, CA (US)

(73) Assignee: Gemini Mobile Technologies, Inc., Saratoga, CA (US)

( * ) Notice: Subject to any disclaimer, the term of this patent is extended or adjusted under 35 U.S.C. 154(b) by 540 days.

(21) Appl. No.: 10/812,990

(22) Filed: Mar. 31, 2004

(65) Prior Publication Data

US 2005/0223163 A1 Oct. 6, 2005

(51) Int. Cl.
G06F 12/00 (2006.01)
(52) U.S. Cl. .................. 711/154; 711/112; 709/206; 709/213
(58) Field of Classification Search .............. None
See application file for complete search history.

(56) References Cited

U.S. PATENT DOCUMENTS

| | | | |
|---|---|---|---|
| 6,275,912 B1 * | 8/2001 | Haba | 711/154 |
| 6,446,144 B1 * | 9/2002 | Habusha et al. | 710/29 |
| 6,988,165 B2 * | 1/2006 | White et al. | 711/113 |
| 2003/0217080 A1 | 11/2003 | White et al. | |
| 2004/0142563 A1 * | 7/2004 | Fontarensky et al. | 438/689 |
| 2004/0268177 A1 | 12/2004 | Ji et al. | |
| 2005/0044151 A1 * | 2/2005 | Jiang et al. | 709/206 |
| 2005/0055593 A1 * | 3/2005 | Shah et al. | 713/375 |

OTHER PUBLICATIONS

International Search Report and Written Opinion for PCT/US05/10093 dated Feb. 23, 2007.

* cited by examiner

Primary Examiner—Hyung Sough
Assistant Examiner—Kaushik Patel
(74) Attorney, Agent, or Firm—Crowell & Moring LLP (57) ABSTRACT

A method comprising receiving a write request; adding the write request to a batch of substantially contiguous disk writes; determining to write the batch of substantially contiguous disk writes to a non-volatile memory; writing the batch of substantially contiguous disk writes to the non-volatile memory; sending a confirmation of writing the batch of substantially contiguous disk writes; receiving a confirmation of the confirmation of writing; and clearing the batch of substantially contiguous disk writes.

73 Claims, 6 Drawing Sheets

SYNCHRONOUS MESSAGE QUEUES

TECHNICAL FIELD

Embodiments of the present invention generally relate to communications. More particularly, embodiments relate to systems and methods for efficiently storing messages in a message relay server.

BACKGROUND OF THE INVENTION

As the popularity of the Internet and wireless communication continues to grow, network designers and service providers are presented with a number of performance concerns. A particular concern relates to message routing. A message router receives messages from sender hosts and forwards these messages to one or more destination hosts. The process of receiving and sending a message is sometimes called a transaction, and is an important component of any networking architecture. It is not uncommon for a high performance message router to be required to complete hundreds of transactions per second.

Traditional messaging systems use a store-and-forward model for message routing. Under such an approach, when a router receives a message the message is stored to a nonvolatile memory ("NVM") so that the contents are preserved when there is no power applied to the memory. Examples of NVM include, but are not limited to, electrically erasable programmable read only memory ("EEPROM") and magnetic disk. Storing the message to NVM enables recovery of the message in the event of a system crash or power failure. Naive techniques for reading from and writing to NVM are relatively slow, and may result in a performance bottleneck in the network.

DETAILED DESCRIPTION

Embodiments of the present invention may combine several techniques to minimize the performance bottleneck that results from writing data to non-volatile memory. The techniques may include writing data contiguously and/or substantially contiguously to disk to take advantage of the contiguous layout of most modern hard disk systems. The techniques may also include performing write requests in batches to minimize the total number of write requests to a disk system and using a separate synchronization helper process to allow synchronous disk writes to be performed asynchronously. The techniques may further include minimizing the data to be written synchronously to disk; and minimizing the cost of removing data from the queue.

In accordance with an embodiment of the present invention, one or more files of a sufficiently large size may be created in non-volatile memory (NVM) and memory-mapped to volatile memory. Messages and/or data to be queued may be copied to memory-mapped regions of one of the files, which may be referred to as a queue data file. An index data structure may be maintained in volatile memory associated with the queue data file and entries in the index data structure may be used to record positions in the queue data file where messages/data has been written. Generally, messages/data may be written to sequential regions of the queue data file to decrease write latency. Processing of the messages/data may involve manipulating the index data structure and accessing the messages/data within the memory-mapped queue data file regions, which essentially leaves the queue data file physically untouched after the messages/data are initially written to the queue data file. If, for some reason, a message can not be processed immediately, the message may be skipped and processed later or moved to a secondary queue. To help minimize data loss and to improve recovery efficiency, the index data structure may be periodically written to non-volatile memory (NVM).

Similarly, in the current embodiment of the present invention, to prevent data loss and to ensure sequential disk writes the queue data file writes may be written synchronously to a disk. Because writing data synchronously to disk is incompatible with an asynchronous input/output ("I/O") environment and usually significantly decreases write performance, a synchronization helper process may be used to batch and sort the queue data file write requests. The synchronization helper process may batch and sort the queue data file write requests so that the memory-mapped regions in the queue data file are synchronized (that is, physically written) to the disk in an efficient and reliable manner.

Figure 1:
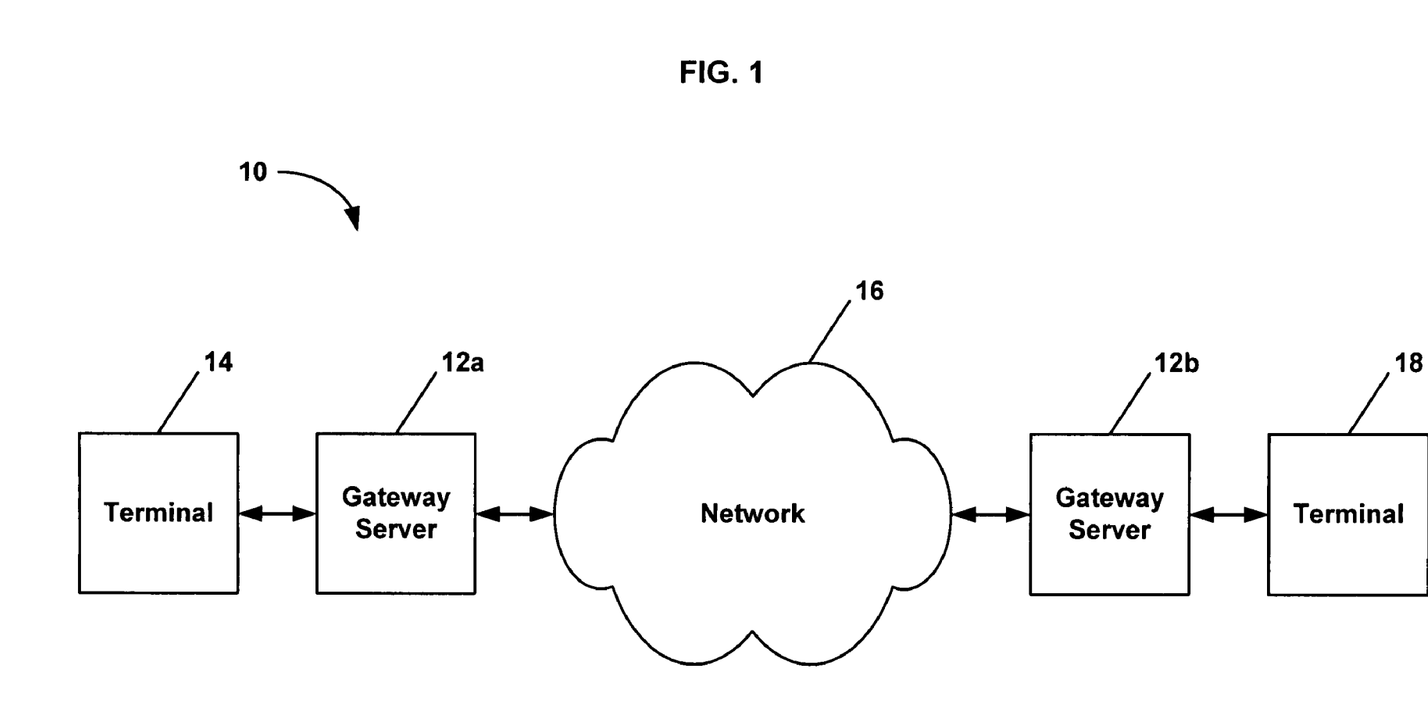
FIG. 1 is a block diagram of a communications system, in accordance with an embodiment of the present invention.

FIG. 1 is a block diagram of a communications system, in accordance with an embodiment of the present invention. In FIG. 1, a system 10 may have a terminal 14 coupled to a gateway server 12a and a terminal 18 coupled to a gateway server 12b. In accordance with the present embodiment, terminal 14 may be a sender host such as a mail client terminal and terminal 18 may be a destination host such as a mail server. For example, terminals 14, 18 may include computers, workstations, personal digital assistants (PDAs), landline and wireless telephones. Sender host 14 may communicate with gateway server 12a (e.g., a mail gateway) and destination host 18 may communicate with gateway server 12b (e.g., a mail gateway), where servers 12a, 12b may communicate with one another via a network 16. Network 16 may include the Internet, a local area network (LAN), and/or a wide area network (WAN). It is recognized that gateway servers 12a and 12b may be servers, routers, switches or the like. It is further recognized that system 10 may include additional components, devices and/or systems that are omitted.

Although certain examples will be described herein with reference to the routing of messages to a destination host, the embodiments of the invention are not so limited. Indeed, the principles described herein can be readily applied to any type of incoming data without departing from the spirit and scope of the embodiments of the invention. For example, images, sound files and other types of data may also benefit from the principles described herein. Notwithstanding, there are a number of aspects of messages for which the embodiments of the invention are well suited. It should also be noted that a single message might be destined for multiple recipients (not shown) and/or destination hosts, where each destination host services the recipients that are connected to that particular receiver host.

It should be noted that traditional Internet Protocol ("IP") routing of data packets is designed to tolerate a certain amount of data loss, whereas routing messages such as Email messages requires a higher level of reliability. As a result, message routers or servers are usually less tolerant to data loss and have traditionally employed the store-and-forward model discussed above. While certain embodiments will be described in reference to one or more of the above protocols, it should be noted that the embodiments of the invention are not so limited. Indeed, any protocol in which the current storing techniques can be implemented may be used.

Figure 2:
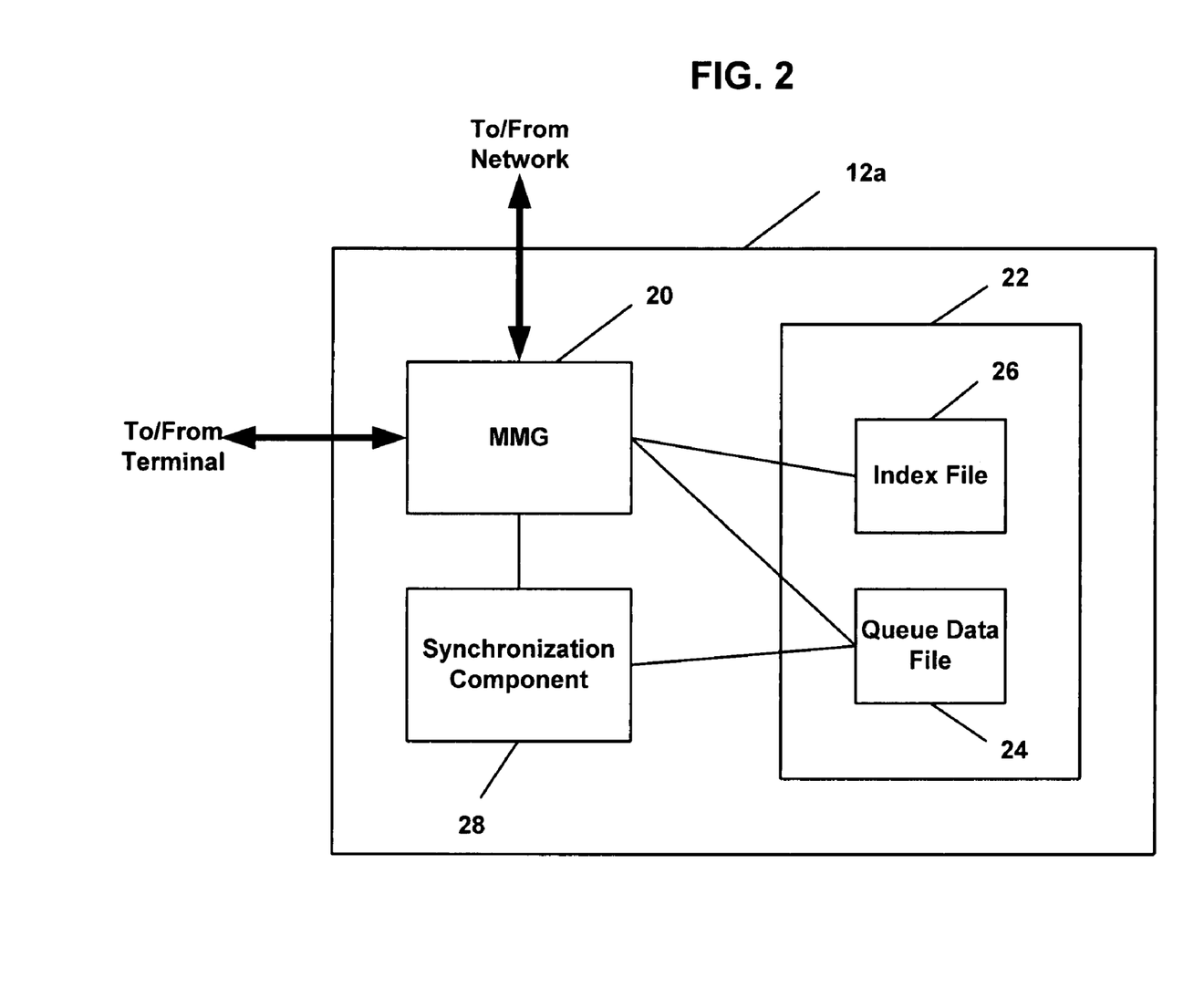
FIG. 2 is a block diagram of a gateway server of FIG. 1, in accordance with an embodiment of the present invention.

FIG. 2 is a block diagram of the gateway server of FIG. 1, in accordance with an embodiment of the present invention. In FIG. 2, gateway server 12a may include a multimedia message gateway ("MMG") 20, which may be coupled to terminal 14 and network 16. MMG 20 may also be coupled to a disk queue 22 and more specifically to a queue data file 24 and an index file 26 in disk queue 22. MMG 20 may be further coupled to a synchronization component 28, which in turn may be coupled to queue data file 24. Synchronization component 28 may be implemented as a process to batch and sort queue data file 24 write requests so that memory-mapped regions in queue data file 24 may be efficiently and reliably be synchronized (that is, physically written synchronously) to a disk file to which queue data file 24 is memory-mapped.

In FIG. 2, MMG 20 may store all outgoing and incoming messages, for example, email messages in disk queue 22 before they are delivered. For example, in the present embodiment, writes to disk queue 22, which may include queue data file 24 and index file 26, are sequential; each write may be synchronized to disk queue 22 before confirmation; and MMG 20 may restore disk queue 22 on startup to resume queue activities. Each message in queue data file 24 may be memory-mapped to memory and be shared by all active processes on MMG 20. Each message in queue data file 24 may have an associated index file 26 from which a queue processing state may be recovered in case of a system crash. Index file 26 may be hereinafter interchangeably referred to as a queue index file 26. In addition, a limited number of messages may be queued and new messages may be rejected if queue data file 24 is full. The number of index entries may be limited by main memory, disk size, and queue file size. Index file 26 may also be memory-mapped into MMG 20 and be shared by all other MMG 20 processes.

In accordance with the present embodiment, each message in queue data file 24 may have an entry in index file 26. Index file 26 may be created at system installation to its maximum allowed size on a dedicated disk partition. Index file 26 may be memory-mapped by MMG 20 and synchronization with the disk file may occur periodically (for example, every ten (10) seconds). Periodic synchronization of index file 26 to non-volatile memory (NVM) may be performed asynchronously and MMG 20, generally, does not wait for confirmation that the write has successfully completed. Periodic synchronization may result in duplicate messages being delivered, if the system crashes before synchronization is completed, however, no messages will be lost. Index file 26 may consist of one "queue_index" structure, which in turn may contain an array of "index_entry" structures. There may also be a mutex variable, which may act as a shared mutual exclusion lock and may be shared by all running MMG 20 processes accessing the index. The mutex variable may act to protect the queue index from simultaneous changes by more than one MMG 20 process. In accordance with the present embodiment, the mutex may be acquired before any reads or writes of header data, and before locking an index entry. Index file 26 may help provide efficient access of queued data. In particular, index file 26 may hold pointers to the location of queued messages. When a message is deleted, index file 26 may be updated to remove that entry, thus negating the need to physically modify queue data file 24. As a result, the "cost," that is, the time and processing resources needed, to remove the data from disk queue 22 may be minimized. Also, index file 26 may keep a limited amount of state information, for example, retry data that may be used frequently by MMG. The retry data of the message may be retrieved and checked faster and more efficiently from the index file 26 rather than queue data file 24.

A data structure for index file 26, in accordance with an embodiment of the present invention, may be defined as follows:

```
struct queue_index {
    int head;              // index of head of the in-use LL
    int tail;              // index of tail of the in-use LL
                           // corresponds to the last entry written
    int free;              // The head of the free list
    int num_entries;
    time_t last_sync;
    struct index_entry[ ];
}
struct index_entry {
    int offset;            // Offset in the queue file.
    int len;               // Length of data in the queue file.
    int lock;              // pid of process which has this entry locked,
                           // or 0 if unlocked.
    byte type;             // Type of index entry. e.g., SMS, SMTP
    int status;
    int checksum;
    int retry_count;
    time_t last_retry;     // date of the last.retry, in unix time
    int prev;              // index of previous item in linked list
    int next;              // index of next item in linked list
}
```

It should be noted that the above data structure for index file 26 is but one possible representation and in no way should be interpreted to limit the possible alternative embodiments currently contemplated. For example, alternative embodiments are contemplated in which less than, additional and combinations thereof of the above and other fields may be included.

To ensure writing data from an index_entry to disk is an atomic operation, a single index_entry should not span more than one disk block. One possible solution to this problem is to add padding to the index_entry structure to ensure that its size is a factor of the disk block size of the operating system. For instance if the disk block size is 4096 bytes, the index_entry data structure could be expanded to a size which was a factor of 4096 bytes, e.g., 32 bytes. If, for example, each entry in index file 26 takes 32 bytes, then a 32-megabyte index file would be required to support one million index entries.

After a system crash, index file 26 and queue data file 24 may be read by MMG 20 to restore the queue processing state that existed prior to the system crash.

Each MMG 20 queue may use one or more dedicated data files and dedicated index files. Each data file may be created on a single disk partition, in general, where there are no other disk files on that partition. As with queue index file 26, queue data file 24 may be created at system installation to their respective maximum allowed size. This helps ensure that queue data file 24 consists of contiguous disk blocks and makes possible contiguous disk writes to queue data file 24. Multiple queue files may be placed on separate physical disks to increase parallelism. Queue data files and queue index files may be placed on separate physical disks to increase parallelism. During initialization of MMG 20, queue data file 24 may be memory-mapped by MMG 20 to store messages. Disk and memory files may be synchronized after each message is added to queue data file 24 to prevent data loss.

A single queue data file size may be limited to, for example, 2 GB or more, however 4 GB is the largest file size where an offset may be expressed using a 32 bit unsigned integer. A queue data file size of over 4 GB is possible, but requires that the queue entry location (queue data file offset) be expressed using a long integer of, for example, 64 bits. If the average incoming message size is 4 k octets, then a 2 GB queue data file 24 can store a maximum of approximately 500 k (k=1024) messages. In addition to the actual message contents, header information may be written to queue data file 24 as well. Such header information may contain a message number, a date of creation and a size of the message written.

In accordance with an embodiment of the present invention, each message may be written to queue data file 24 along with certain sequence and envelope information. Because the queue recovery process may not always be able to rely on index file 26 being complete, queue data file 24, generally, should contain enough information to rebuild the index entry for the message. Therefore, queue data file 24 entry format may include, for example:

| Signature | char[ ] | A unique signature indicating the start of a new message |
|---|---|---|
| Date | Int | Date message was added to the queue. As seconds since epoch. |
| Message type | byte | Type of message SMS, SMTP, etc. |
| data length | Int | The length of the sender data. |
| Message data | char[ ] | The message data. |
| Checksum | Int | Checksum for message data |

In accordance with an embodiment of the present invention, a queue index file restore procedure may be included, since queue index file 26 is, generally, not synchronously written to disk. To facilitate the restore procedure queue index file 26 (as shown in the data structure previously described) may include a field "time_t_last_sync," which may specify the last time the index file was written to disk. In general, the time_t_last_sync data may only be modified immediately before the file is synchronized to disk. Each queue entry in queue data file 24 may start at an offset, which, generally, is on a predetermined boundary, for example, 256 byte boundaries. Queue data file entries may be pre-pended, that is, pre-fixed, with a fixed 4 byte signature as the first 4 bytes of the entry, for example, "\252\88\132\133". To ensure that it reflects the correct index information for queue data file 24, queue index file 26 may be validated using a validation procedure. For example, in accordance with an embodiment of the present invention, one possible validation procedure may be implemented as described in the following pseudo-code procedure:

```
scan queue index file "inuse" linked list;
    if loop discovered, break loop;
    if any entry is locked, unlock;
    if any entry is marked as free, move to "free" list;
scan queue index file "free" list;
    if loop discovered, break loop;
    if the entry is marked as "inuse" and the entry points to valid data, move the entry to "inuse" list;
    for any entries not on the "inuse" list or the "free" list;
    if locked, unlock the entry;
    if not marked free, and the entry points to valid data, move the entry to the "inuse" list;
    if not marked free, but the entry points to invalid data, move the entry to the "free" list;
    if free, move the entry to the "free" list.
```

Figure 3:
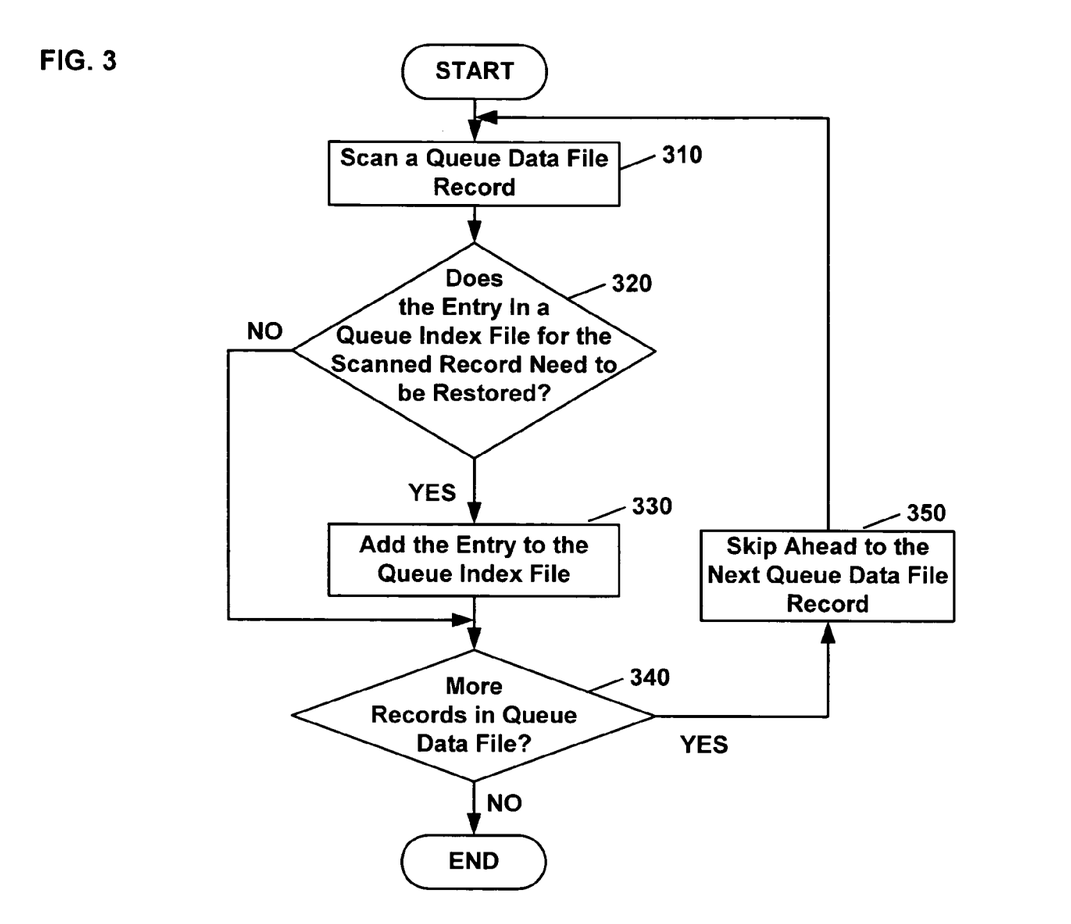
FIG. 3 is a flowchart of a method of restoring a queue index file, in accordance with an embodiment of the present invention.

FIG. 3 is a flowchart of a method of restoring information to a queue index file after a system crash, in accordance with an embodiment of the present invention. In FIG. 3, records on queue data file 24 may be scanned (310) at, for example, predetermined boundary intervals, such as, at 256-byte intervals, for possible entries for queue index file 26. Whether an entry needs to be restored to queue index file 26 may be determined (320). To determine (320) the entry needs to be restored may include determining whether the entry is valid. The entry may be determined to be valid, if both of the following conditions are true: 1) the first 4 bytes match the fixed 4 byte header; and 2) an entry Checksum is correct. Determining (320) whether the entry needs to be restored may also include determining whether a valid entry may be missing from queue index file 26. A valid entry may be determined to be missing, if either of the following conditions are true: 1) the entry's date field contains a date that is after that contained in last_sync time field of queue index file 26, or 2) the entry is not in queue index file 26. Therefore, the entry may be added (330) to queue index file 26, if the entry is determined (320) to be both valid and missing. Whether there are more records on queue data file 24 may be determined (340). If more records are determined (340) to be on queue data file 24, the method may cause the scan to skip (350) ahead to the next record on queue data file 24. The distance to be skipped (350) may either be equal to the predetermined boundary interval or a distance equal to the entry's length field optionally rounded to the nearest boundary interval. In general, regardless of whether or not an entry for the record was determined (320) to exist, the distance to be skipped (350) may be the predetermined boundary interval. However, if the record was determined (320) to exist, the distance to be skipped (350) may be determined by the entry's length field optionally rounded to the nearest boundary interval, which may provide some performance improvements over skipping (350) the predetermined boundary interval. The method may loop back to continue scanning (310) queue data file 24, as described above. Otherwise, the method may terminate, if no more records are determined (340) to be in queue data file 24.

Message data may have a specific format depending on the type of message. For example, in accordance with an embodiment of the present invention, SMTP message data may have the following format:

| Sender length | Int | The length of the sender data. |
|---|---|---|
| Sender data | char[ ] | The sender data |
| Recipient length | Int | The length of the recipient data |

| | | |
|---|---|---|
| -continued | | |
| Recipient data | char[ ] | The recipient data. Note: more then one recipient may be contained in this field. |
| Message data length | Int | The length of the message data |
| Message data | char[ ] | The message data. |

Similarly, in accordance with an embodiment of the present invention, SMS messages may have the following format:

| | | |
|---|---|---|
| Sender MSISDN | Int | MSISDN of sender. |
| Num Recipients | byte | Number of recipients |
| Recipients | int[ ] | Array of MSISDN numbers. The recipient data. |
| Message data length | Int | The length of the message data |
| Message data | char[ ] | The message data. |

Also, delivery instructions may be added to the message format, such as, for example, a mail server hostname, or a SMSC location, to prevent user authorization (for example, Lightweight Directory Access Protocol ("LDAP") lookup) from being performed twice. MMG 20 Queue Tasks. Returning to FIG. 2, in accordance with an embodiment of the present invention, disk queue 22 may consist of queue data file 24 (although other embodiments are contemplated in which more than one queue data file 24 is possible) and index file 26. While in the present embodiment, queue data file 24 and index file 26 may be stored on a physical disk, various portions of queue data file 24 may also be memory-mapped into main memory to improve processing efficiency.

Adding a Message to the Queue. This task may add a message to queue data file 24. An addition may be considered successful when a confirmation is received that the message has been written to disk. In an embodiment of the present invention, a message may be added when an entry in queue index file 26 has been successfully allocated and when there is enough space in queue data file 24 to hold the message. Otherwise, the message may be rejected. If the message is added, the content of the message may be copied to the reserved space in queue data file 24 and disk synchronization may be performed after the copy operation to queue data file 24 completes.

Storage Availability Check. In general, there are two cases to consider when performing a queue storage availability check. In addition, it is important to know the current offsets at which queue data file 24 is being read (R) and written (W), the size to be reserved (S) and the maximum size of queue data file 24 (O).

In the present embodiment, R may correspond to the offset position of the first queue entry and W may correspond to the offset of the last queue entry plus the length of that entry. Thus, in accordance with an embodiment of the present invention, a data structure for queue index may be defined as:

```
struct queue_index q_index;
[. . .]
R = q_index.index_entry[q_index.head].offset;
W = q_index.index_entry[q_index.tail].offset +
    q_index.index_entry[q_index.tail].len;
```

It should be noted that all arithmetic may be modulo of queue data file 24 size, although that specific detail is left out here for readability.

In a first case, in accordance with the present embodiment, the current read offset R may be less than the current write offset W. The space available for storage may be represented as s=Q−W, and allocation may be successful if S is less than s. Otherwise, W may be reset or wrapped around to the beginning of queue data file 24 and the space availability check may be performed again as in the case described below.

In a second case, in accordance with the present embodiment, the current write offset W may be less than the current read offset R, and the available space for storage may be represented as s=R−W. If s is less than S, the queue entry at offset R may be skipped.

Although it has been previously described how to check for free storage space in queue data file 24, if the read and write positions are too close, there may be no space to put new message data. This may happen when queue data file 24 is full, in which case there may be no choice but to reject the incoming message. Fortunately, this possibility is unlikely. More likely, however, is that the space between the read and the write positions may be small because the message at the read position (q_index.head) is very old. In this case, the old message may be skipped by moving it from the head to the tail of the list. This may be accomplished, for example, by the following code segment:

```
MMG_mutex_acquire (index_lock)
int tmp = q_index.head;
q_index.head = q_index.indexL_entry[q_index.head].next;
q_index.index_entry[q_index.head].prev = −1; //NONE
q_index..index_entry[q_index.tail].next = tmp;
q_index.index_entry[tmp].prev = q_index.tail;
q_index.index_entry[tmp].next = −1;           //NONE
q_index.tail = tmp;
MMG_mutex_release(index_lock);
```

This operation has the effect of moving both the write pointer (W) and the read pointer (R).

Index Entry Allocation. In accordance with an embodiment of the present invention, index entries may be stored in an array. When the index is first instantiated, a linked list of free index entries may be established. For example, q_index.free may point to the head of that linked list. Each entry on the free list may use its index_entry.next value to point to the next entry on the list. The list may be ended with a −1. When a new index is needed, the process may first acquire the index_lock, and then it may pop the first item off the stack q_index.free, as illustrated in the following code segment:

```
int new_entry = q_index.free;
if (new_entry = = −1) return ERROR_NO_MORE_INDEX_ENTRIES;
q_index.free = q_index.index_entries[q_index.free].next;
```

Queue Processing. In accordance with an embodiment of the present invention, queue processing processes or threads, in general, take messages sequentially from the message queue at the root index. Each message may be locked for processing, and then unlocked if it cannot be processed successfully. If the message's retry limit is exceeded the message may be deleted from the queue by moving it's corresponding index entry from the in_use list of the index file to the free list. The index entry may be similarly moved from the in_use list to the free list after the message is processed, either successfully or unsuccessfully.

In accordance with an embodiment of the present invention, an in-memory index may be used to group all messages destined to the same host or domain. This allows many messages to be sent at once to a single host.

Queue File Synchronization. Queue file synchronization may be accomplished by using a synchronous command, for example, msync(), to ensure the data was successfully saved to disk, in accordance with an embodiment of the present invention. However, since the synchronous call to msync() may block all other threads of operation and block all access to the disk queue, a helper process, for example, as shown in FIG. 2, synchronization component 28, may be used to handle the synchronization. MMG 20 may use first-in, first-out ("FIFO") queues to communicate with synchronization component 28.

Figure 4:
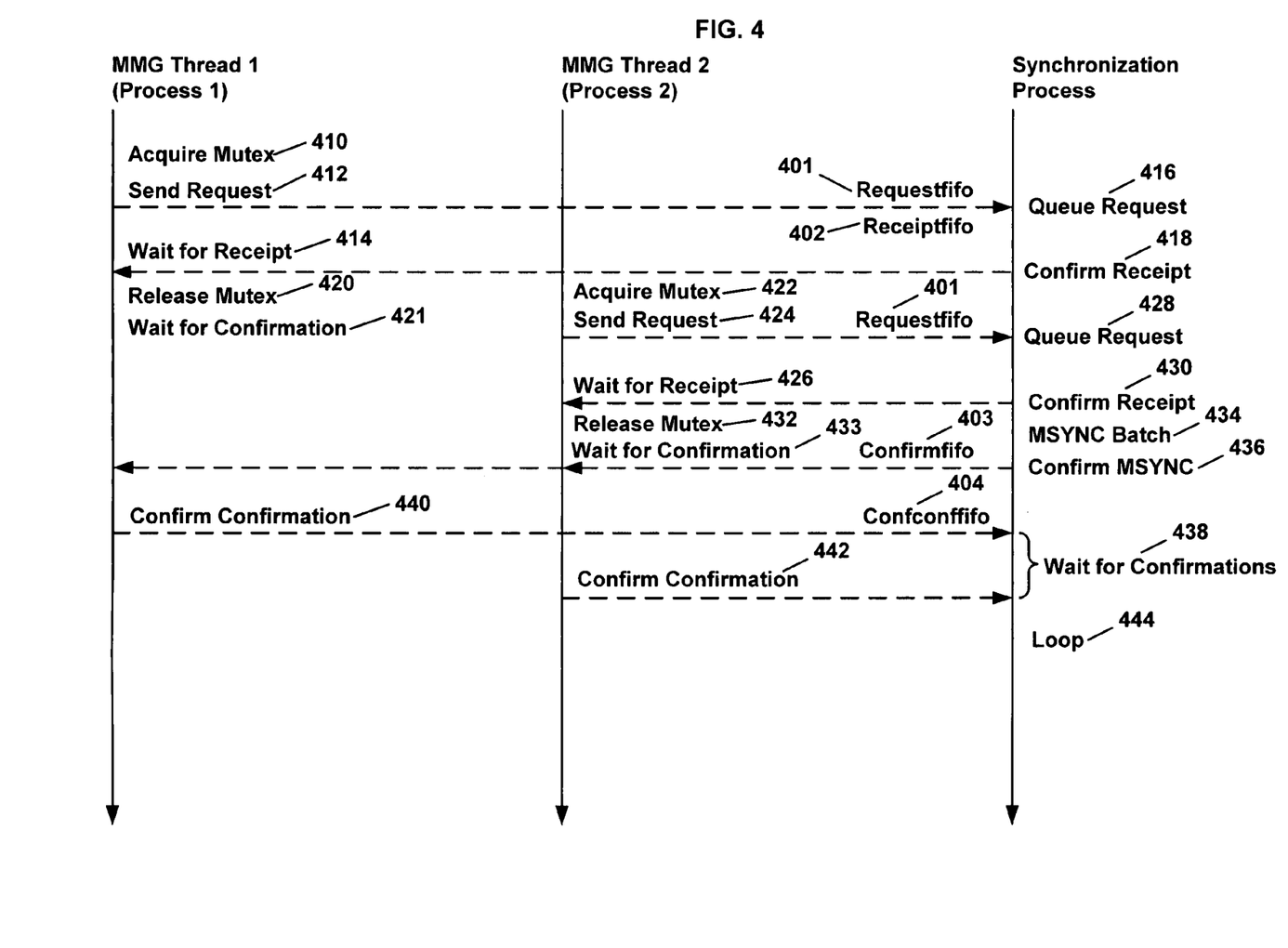
FIG. 4 is a flowchart of an example of a method of processing incoming data according to one embodiment of the present invention.

FIG. 4 is a flowchart of an example of a method of processing incoming data according to one embodiment of the present invention. In FIG. 4, a two-phased, batched approach for synchronization component 28 that can result in good parallelism is illustrated. This approach may use four FIFO queues:

requestfifo 401—MMG 20 to send requests to synchronization component 28 receiptfifo 402—synchronization component 28 to confirm receipt of the request confirmfifo 403—synchronization component 28 to confirm completion of all received requests.

confconffifo 404—MMG 20 to confirm each received confirmation with synchronization component 28.

In FIG. 4, synchronization component 28 may listen on requestfifo 401 for a command to msync data. The command may come as a 4-byte integer, an offset, followed by a 4-byte integer, a length. The command may also come as a 4-byte integer, an offset, followed by an 8-byte long integer, a length. The offset may refer to a position in an mapped file in queue data file 24.

In FIG. 4, an MMG thread, for example MMG thread 1, may acquire (410) a mutex and send (412) a synchronization ("sync") request to synchronization component 28 via requestfifo 401. MMG thread 1 may wait (414) for a receipt to indicate the sync request was received and synchronization component 28 may queue (416) the received sync request and send (418) a confirmation that the sync request was received to MMG thread 1 via receiptfifo 402. After receiving the confirmation that the request was received, MMG thread 1 may release (420) the mutex and wait (421) for confirmation from confirmfifo 403 that the request was processed. More than one MMG 20 may wait on confirmfifo 403 at a time.

In FIG. 4, a second MMG thread, MMG thread 2, may acquire (422) the mutex after it is released (420) by MMG thread 1. MMG thread 2 may send (424) another sync request to synchronization component 28 via requestfifo 401 and wait (426) for a receipt to indicate the sync request was received and synchronization component 28 may queue (428) the received sync request and send (430) a confirmation that the sync request was received back to MMG thread 2. MMG thread 2 may release (432) the mutex and wait (433) for a confirmation of the msync.

In FIG. 4, synchronization component 28 may batch requests as they are received. For example, synchronization component 28 may continue to batch sync requests until it either has received a contiguous or substantially contiguous set of sync requests, or some predetermined event or timeout occurs. At this point, synchronization component 28 may stop accepting new sync requests on requestfifo 401 and carry out (434) all received sync requests. If the appropriate portion of the mapped file is already mapped, a simple msync may be called (434). If not, the appropriate portion may be mapped, and then msync may be called (434). Synchronization component 28 may send (436) out N sync confirmations to the affected threads (for example, MMG thread1 and MMG thread2) and wait (438) for confirmation(s) of the sent N sync confirmations. N being the number of MMG threads waiting on the confirmations. Although not shown, if a sync request is received that does not qualify as being substantially contiguous with the current batch of write requests, according to some configuration parameters, the sync request that was received may be delayed until the start of a next batch and the delayed sync request may be processed in the next batch.

There may be a race condition, where not every MMG thread has received the signal from confirmfifo 403 before an additional MMG thread starts listening on confirmfifo 403. Thus, confconffifo 404 may be used such that each MMG thread is required to confirm the receipt of each confirmation. When each confirmation has been confirmed, synchronization component 28 may start receiving and confirming receipt of other sync requests again. For example, MMG thread 1 may send (440) a confirmation of the sent (436) msync confirmation back to synchronization component 28 and MMG thread 2 may send (442) a confirmation of the sent (436) msync confirmation back to synchronization component 28. Synchronization component 28 may loop (444) back to continue to receive and queue (416) msync requests from active threads.

Timeouts may be employed within synchronization component 28 to deal with the case where MMG 20 dies before it is able to confirm the receipt of a confirmation via confconffifo 404. Similarly, MMG 20 may have a timeout so it may detect when synchronization component 28 has died and was restarted.

At low throughput, employing a separate synchronization component may be slower than a simple synchronized request/response system, but this approach should have a higher maximum throughput. This may result in fewer system calls to msync, since each call will ask msync to synchronize more data. The longer synchronization component 28 can wait for the sync requests to form a contiguous block, the higher the throughput that can be achieved, however, this means that a low throughput system may be less efficient and experience higher latency times. Thus many configuration options may be specified to synchronization component 28 to fine tune the performance to the synchronization component 28. For example, the following configuration options could be set in the synchronization component: maximum batch size specified in bytes; maximum batch size specified by number of write requests; maximum batch gathering time; maximum allowed time without a new write request; maximum offset (in pages or bytes) where a new write request will not be considered substantially contiguous.

Memory Mapping Operation. Multiple regions may be memory-mapped to queue data file 24 for writing and reading messages to and from queue data file 24. A predetermined size in octets may be used when mapping an interested region, and care should be taken in selecting the size so that the system does not have to perform re-mapping frequently. In general, the size of the region to be mapped should be a multiple of disk page size. It is important to note that each thread or process may have its own map of queue data file 24.

For example, in accordance with one embodiment of the present invention, the approach may be to have one mapped region for reading and another mapped region for writing. This means that it is possible to remap the "reading" region while writing to the "writing" region. It is also important to check the bounds of each mapped region before beginning any operation on that region. Synchronization component 28 may use its own memory map when performing disk synchronization tasks.

In accordance with another embodiment of the present invention, an approach may be to maintain a configurable sized pool of memory mapped regions which can be locked for exclusive use by any individual thread or process, optionally remapped by the thread or process, read or written to, and then unlocked when the thread or process is finished. In this embodiment, a wait-queue of threads is maintained when more threads require a mapped region then there are mapped regions in the pool.

Figure 5:
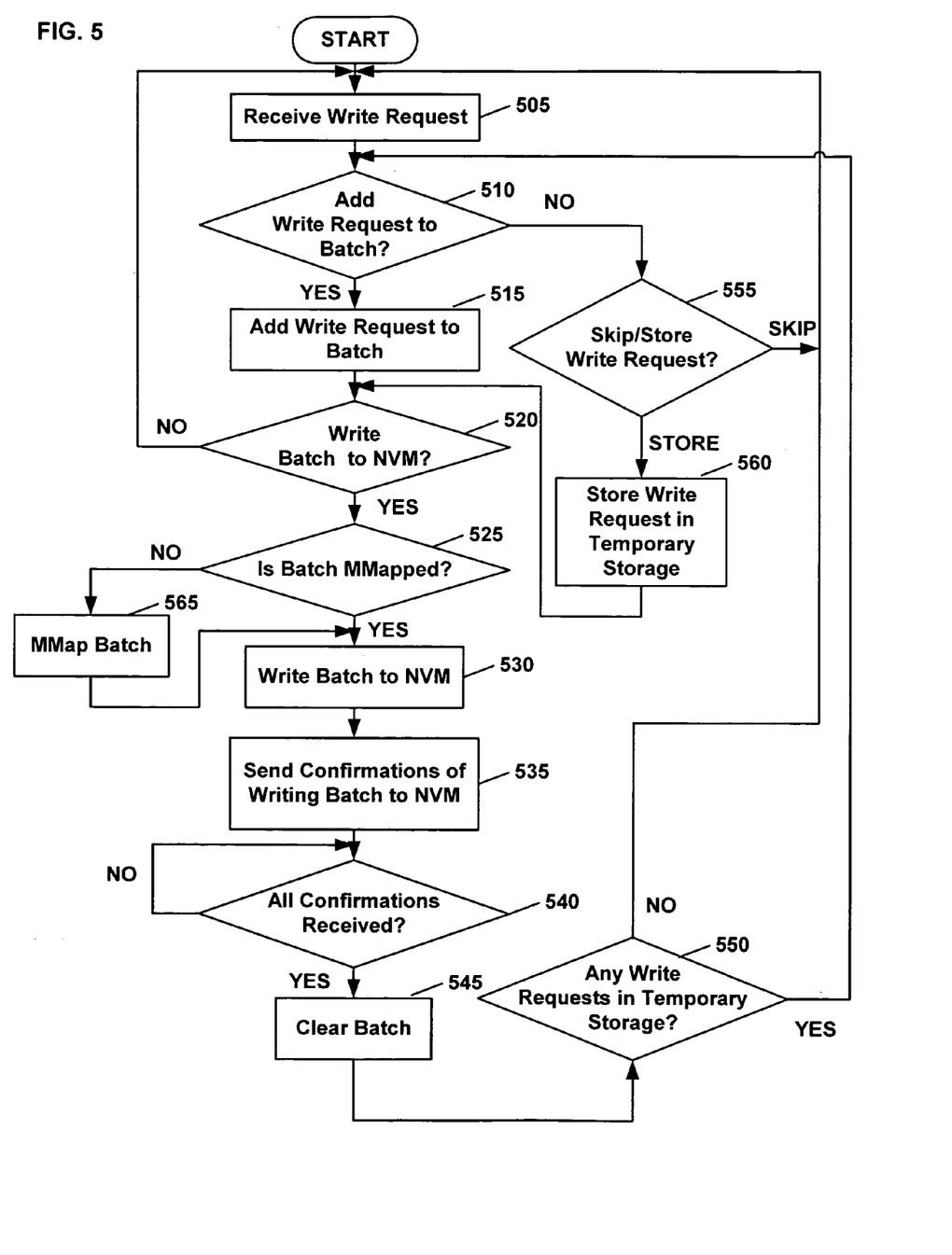
FIG. 5 is a flowchart of an example of a method of processing incoming data according to an alternative embodiment of the present invention.

FIG. 5 is a flowchart of an example of a method of processing incoming data according to an alternative embodiment of the present invention. In FIG. 5, a write request may be received (505) from an executing process and the method may determine (510) whether to add the write request to a batch of substantially contiguous disk writes. If it is determined (510) to add the write request to the batch of substantially contiguous disk writes, the write request may be added (515) to the batch of substantially contiguous disk writes. The method may determine (520) whether to write the batch of substantially contiguous disk writes to a non-volatile memory and, if it is determined (520) to write the batch of substantially contiguous disk writes to the non-volatile memory, whether the batch of substantially contiguous disk writes is memory mapped may be determined (525).

In FIG. 5, if the batch of substantially contiguous disk writes is determined (525) to be memory mapped, the batch of substantially contiguous disk writes may be written (530) to the non-volatile memory. Confirmations of the writing of the batch of substantially contiguous disk writes may be sent (535) to the process(es) from which the write requests were originally received. The method may wait to receive (540) confirmations of the sent (535) confirmations from each of the process(es) that sent (535) the write confirmations. If confirmations of the sent (535) confirmations are received (540) from each of the process(es), the batch of substantially contiguous disk writes may be cleared (545) and whether there are any skipped write requests and/or write requests saved in a temporary storage may be determined (550). If it is determined (550) that there are write requests saved in the temporary storage, the method may loop to determine (510) whether to add one of the saved write requests to a batch of substantially contiguous disk writes and continue as described above. If it is determined (550) that there are not any write requests saved in the temporary storage, the method may loop to receive (505) a new write request and continue as described above.

In FIG. 5, if it is determined (510) not to add the received write request to the batch of substantially contiguous disk writes, whether to skip or save the write request in the temporary storage may be determined (555). If it is determined (555) to skip the write request, the method may loop to receive (505) a new write request and continue as described above. If it is determined (555) to save the write request in the temporary storage, the method may save (560) the write request in the temporary storage and loop to receive (505) a new write request and continue as described above.

In FIG. 5, if it is determined (525) that the batch of substantially contiguous disk writes is not memory mapped with the non-volatile memory, the method may memory map (565) the write request with the non-volatile memory. The method may write (530) the batch of substantially contiguous disk writes to the non-volatile memory and continue as described above.

Figure 6:
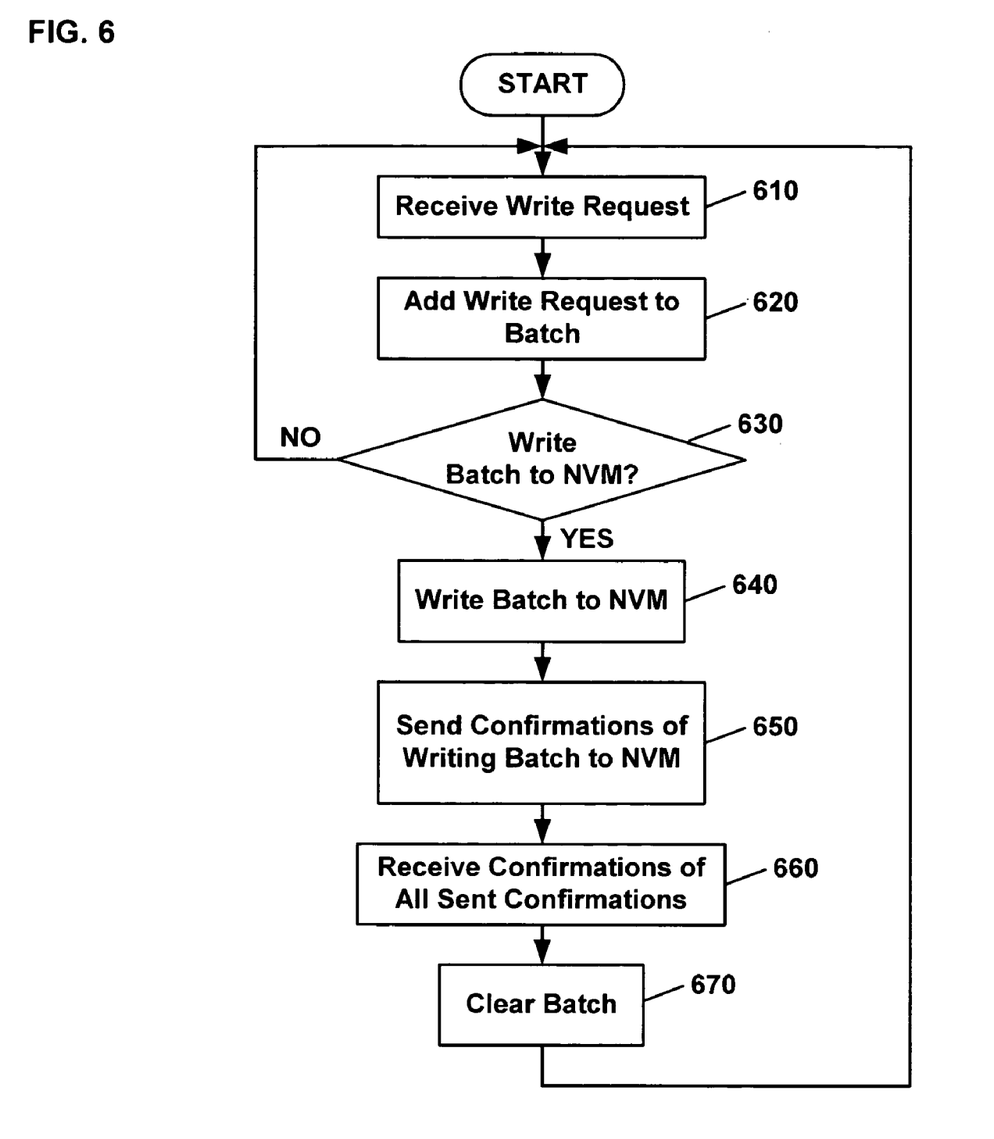
FIG. 6 is a process flowchart illustrating a process of determining if a write request should trigger a batch write according to one embodiment of the present invention.

FIG. 6 is a process flowchart illustrating a process of determining eligibility for stateless routing according to one embodiment of the present invention. In FIG. 6, a write request may be received (610) from an executing process and the method may add (620) the write request to a batch of substantially contiguous disk writes. The method may determine (630) whether to write the batch of substantially contiguous disk writes to a non-volatile memory and, if it is determined (630) to write the batch of substantially contiguous disk writes to the non-volatile memory, the batch of substantially contiguous disk writes may be written (640) to the non-volatile memory. Confirmations of the writing of the batch of substantially contiguous disk writes may be sent (650) to the process(es) from which the write requests were originally received. The method may receive (660) confirmations of the sent (650) confirmations from each of the process(es) that sent (650) the write confirmations. The batch of substantially contiguous disk writes may be cleared (670) and the method may loop to receive (610) a new write request and continue as described above.

In FIG. 6, if it is determined (630) not to write the batch of substantially contiguous disk writes, the method may loop to receive (610) a new write request and continue as described above.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
   receiving a write request;
   adding the write request to a batch of disk writes;
   determining to write the batch of disk writes to a non-volatile memory;
   writing the batch of disk writes to the non-volatile memory;
   sending a confirmation of writing the batch of disk writes;
   receiving a confirmation of the confirmation of writing; and
   clearing the batch of disk writes.

2. The method of claim 1 wherein receiving the write request comprises:
   receiving the write request for a memory location that is contiguous to a memory location in the batch of disk writes.

3. The method of claim 1 wherein receiving a write request comprises:
   receiving the write request from a processing thread.

4. The method of claim 3 wherein receiving the write request from a processing thread comprises:
   receiving the write request from a processing thread located in a multimedia message gateway.

5. The method of claim 1 wherein determining to write the batch of disk writes to a non-volatile memory comprises:
  determining a pre-defined period of time has elapsed since a previous write of the batch of disk writes to the non-volatile memory.

6. The method of claim 1 wherein determining to write the batch of disk writes to a non-volatile memory comprises:
  determining a pre-defined size of the batch of disk writes has been exceeded.

7. The method of claim 1 wherein determining to write the batch of disk writes to a non-volatile memory comprises:
  determining the batch of disk writes contains a plurality of contiguous write requests.

8. The method of claim 1 wherein determining to write the batch of disk writes to a non-volatile memory comprises:
  determining a size of the batch of disk writes exceeds a predetermined maximum number of bytes.

9. The method of claim 1 wherein determining to write the batch of disk writes to a non-volatile memory comprises:
  determining a number of write requests stored in the batch of disk writes exceeds a predetermined maximum number.

10. The method of claim 1 wherein determining to write the batch of disk writes to a non-volatile memory comprises:
  determining a predetermined maximum time to gather the batch of disk writes has been exceeded.

11. The method of claim 1 wherein determining to write the batch of disk writes to a non-volatile memory comprises:
  determining a predetermined maximum time since receipt of the last write request has been exceeded.

12. The method of claim 1 wherein determining to write the batch of disk writes to a non-volatile memory comprises:
  determining the write request exceeds a maximum allowable page offset in the batch of disk writes.

13. The method of claim 1 wherein determining to write the batch of disk writes to a non-volatile memory comprises:
  determining the write request exceeds a maximum allowable byte offset in the batch of disk writes.

14. The method of claim 1 wherein writing the batch of disk writes to the non-volatile memory comprises:
  writing the batch of disk writes to the non-volatile memory asynchronously.

15. The method of claim 1 wherein writing the batch of disk writes to the non-volatile memory comprises:
  determining whether the batch of disk writes is memory mapped;
  memory mapping the batch of disk writes, if the batch of disk writes is not memory mapped; and
  writing the batch of disk writes to the non-volatile memory.

16. The method of claim 1 further comprising:
  determining whether there is an outstanding unprocessed write request in a temporary storage; and
  adding the outstanding unprocessed write request to a new batch of disk writes, if there is an outstanding unprocessed write request in the temporary storage.

17. A machine-readable medium having stored thereon a plurality of executable instructions to perform a method comprising:
  receiving a write request;
  adding the write request to a batch of disk writes;
  determining it is possible to write the batch of substantially contiguous disk writes to a non-volatile memory;
  writing the batch of disk writes to the non-volatile memory;
  sending a confirmation of writing the batch of disk writes;
  receiving a confirmation of the confirmation of writing; and
  clearing the batch of disk writes.

18. The machine-readable medium of claim 17 wherein receiving the write request comprises:
  receiving the write request for a memory location that is contiguous to a memory location in the batch of disk writes.

19. The machine-readable medium of claim 17 wherein receiving a write request comprises:
  receiving the write request from a processing thread.

20. The machine-readable medium of claim 19 wherein receiving the write request from a processing thread comprises:
  receiving the write request from a processing thread located in a multimedia message gateway.

21. The machine-readable medium of claim 17 wherein determining to write the batch of disk writes to a non-volatile memory comprises:
  determining a pre-defined period of time has elapsed since a previous write of the batch of disk writes to the non-volatile memory.

22. The machine-readable medium of claim 17 wherein determining to write the batch of disk writes to a non-volatile memory comprises:
  determining a pre-defined size of the batch of disk writes has been exceeded.

23. The machine-readable medium of claim 17 wherein determining it is possible to write the batch of disk writes to a non-volatile memory comprises:
  determining the batch of disk writes contains a plurality of contiguous write requests.

24. The machine-readable medium of claim 17 wherein determining to write the batch of disk writes to a non-volatile memory comprises:
  determining a size of the batch of disk writes exceeds a predetermined maximum number of bytes.

25. The machine-readable medium of claim 17 wherein determining to write the batch of disk writes to a non-volatile memory comprises:
  determining a number of write requests stored in the batch of disk writes exceeds a predetermined maximum number.

26. The machine-readable medium of claim 17 wherein determining to write the batch of disk writes to a non-volatile memory comprises:
  determining a predetermined maximum time to gather the batch of disk writes has been exceeded.

27. The machine-readable medium of claim 17 wherein determining to write the batch of disk writes to a non-volatile memory comprises:
  determining a predetermined maximum time since receipt of the last write request has been exceeded.

28. The machine-readable medium of claim 17 wherein determining to write the batch of disk writes to a non-volatile memory comprises:
  determining the write request exceeds a maximum allowable page offset in the batch of disk writes.

29. The machine-readable medium of claim 17 wherein determining to write the batch of disk writes to a non-volatile memory comprises:
  determining the write request exceeds a maximum allowable byte offset in the batch of disk writes.

30. The machine-readable medium of claim 17 wherein writing the batch of disk writes to the non-volatile memory comprises:

writing the batch of disk writes to the non-volatile memory asynchronously.

31. The machine-readable medium of claim 17 wherein writing the batch of disk writes to the non-volatile memory comprises:
   writing the batch of disk writes to the non-volatile memory asynchronously.

32. The machine-readable medium of claim 17 wherein writing the batch of disk writes to the non-volatile memory comprises:
   determining whether the batch of disk writes is memory mapped;
   memory mapping the batch of disk writes, if the batch of disk writes is not memory mapped; and
   writing the batch of disk writes to the non-volatile memory.

33. The machine-readable medium of claim 17 further comprising:
   determining whether there is an outstanding unprocessed write request in a temporary storage; and
   adding the outstanding unprocessed write request to a new batch of disk writes, if there is an outstanding unprocessed write request in the temporary storage.

34. A method comprising:
   acquiring control of a shared mutual exclusion lock by a first thread or process;
   sending a first write request from the first thread or process to a synchronization process;
   queuing the first write request by the synchronization thread or process;
   sending a confirmation of receipt of the first write request to the first thread or process;
   releasing control of the shared mutual exclusion lock by the first thread or process upon receipt of the confirmation of the receipt of the first write request;
   acquiring control of the shared mutual exclusion lock by a second thread or process;
   sending a second write request from the second thread or process to the synchronization process;
   queuing the second write request with the first write request by the synchronization process;
   sending a confirmation of receipt of the second write request to the second thread or process;
   releasing control of the shared mutual exclusion lock by the second thread or process upon receipt of the confirmation of the receipt of the second write request;
   writing the queued first and second write requests to a non-volatile memory;
   sending a confirmation of writing to the non-volatile memory to each of the first thread or process and the second thread or process;
   sending a confirmation of receipt of the confirmation of writing from each of the first thread or process and the second thread or process; and
   restarting the method, if the confirmation of receipt of the confirmation of writing is received from each of the first thread or process and the second thread or process.

35. The method of claim 34 wherein writing the queued first and second write requests to a non-volatile memory comprises:
   determining whether a predetermined condition has occurred; and
   writing the queued first and second write requests to the non-volatile memory, if the predetermined condition has occurred.

36. The method of claim 35 wherein the predetermined condition comprises:
   a predetermined period of time is exceeded.

37. The method of claim 35 wherein the predetermined condition comprises:
   a size of the queued write requests exceeds a predetermined maximum number of bytes.

38. The method of claim 35 wherein the predetermined condition comprises:
   a number of queued write requests exceeds a predetermined maximum number.

39. The method of claim 35 wherein the predetermined condition comprises:
   a predetermined maximum time to gather the queued write requests has been exceeded.

40. The method of claim 35 wherein the predetermined condition comprises:
   a predetermined maximum time since receipt of a last write request has been exceeded.

41. The method of claim 35 wherein the predetermined condition comprises:
   a new write request exceeds a maximum allowable page offset from the queued write requests.

42. The method of claim 35 wherein the predetermined condition comprises:
   a new write request exceeds a maximum allowable byte offset from the queued write requests.

43. A machine-readable medium having stored thereon a plurality of executable instructions to perform a method comprising:
   acquiring control of a shared mutual exclusion lock by a first thread or process;
   sending a first write request from the first thread or process to a synchronization process;
   queuing the first write request by the synchronization thread or process;
   sending a confirmation of receipt of the first write request to the first thread or process;
   releasing control of the shared mutual exclusion lock by the first thread or process upon receipt of the confirmation of the receipt of the first write request;
   acquiring control of the shared mutual exclusion lock by a second thread or process;
   sending a second write request from the second thread or process to the synchronization process;
   queuing the second write request with the first write request by the synchronization process;
   sending a confirmation of receipt of the second write request to the second thread or process;
   releasing control of the shared mutual exclusion lock by the second thread or process upon receipt of the confirmation of the receipt of the second write request;
   writing the queued first and second write requests to a non-volatile memory;
   sending a confirmation of writing to the non-volatile memory to each of the first thread or process and the second thread or process;
   sending a confirmation of receipt of the confirmation of writing from each of the first thread or process and the second thread or process; and
   restarting the method, if the confirmation of receipt of the confirmation of writing is received from each of the first thread or process and the second thread or process.

44. The machine-readable medium of claim 43 wherein queuing the first write request comprises:
   storing the first write request in a batch file.

45. The machine-readable medium of claim 44 wherein queuing the second write request comprises:
   storing the second write request in the batch file.

46. The machine-readable medium of claim 43 wherein the queued first and second write requests are written upon occurrence of a predetermined condition.

47. The machine-readable medium of claim 46 wherein the predetermined condition comprises:
a predetermined period of time is exceeded.

48. The machine-readable medium of claim 46 wherein the predetermined condition comprises:
a size of the queued write requests exceeds a predetermined maximum number of bytes.

49. The machine-readable medium of claim 46 wherein the predetermined condition comprises:
a number of queued write requests exceeds a predetermined maximum number.

50. The machine-readable medium of claim 46 wherein the predetermined condition comprises:
a predetermined maximum time to gather the queued write requests has been exceeded.

51. The machine-readable medium of claim 46 wherein the predetermined condition comprises:
a predetermined maximum time since receipt of a last write request has been exceeded.

52. The machine-readable medium of claim 46 wherein the predetermined condition comprises:
a new write request exceeds a maximum allowable page offset from the queued write requests.

53. The machine-readable medium of claim 46 wherein the predetermined condition comprises:
a new write request exceeds a maximum allowable byte offset from the queued write requests.

54. An apparatus comprising:
a gateway;
a queue data file coupled to the gateway;
an index file coupled to the gateway; and
a synchronization component coupled to the gateway and the queue data file, the synchronization component to
receive a write request;
add the write request to a batch of disk writes;
determine whether to write the batch of disk writes to a non-volatile memory;
write the batch of disk writes to the non-volatile memory;
send a confirmation of writing the batch of disk writes;
receive a confirmation of the confirmation of writing; and
clear the batch of disk writes.

55. The apparatus of claim 54 wherein the gateway comprises:
a multi-media message gateway.

56. The apparatus of claim 54 wherein the queue data file and the index file are included in a disk queue.

57. The apparatus of claim 54 wherein the queue data file comprises:
a record including information sufficient to rebuild an associated entry for the record in the index file.

58. The apparatus of claim 54 wherein the index file comprises:
an entry associated with a record in the queue data file, the entry including a data structure having an index component and an entry information component.

59. The apparatus of claim 54 wherein the gateway is to read the queue data file and the index file to restore a queue processing state that existed prior to a system crash of the apparatus.

60. The apparatus of claim 54 wherein the queue data file is located on a single disk partition.

61. The apparatus of claim 54 wherein the queue data file comprises a plurality of contiguous disk blocks.

62. A method comprising:
receiving a write request;
determining whether to add the write request to a batch of outstanding requests;
adding the write request to the batch, if it is determined to add the write request to the batch;
determining whether to write the batch to a non-volatile memory;
determining whether the batch is memory-mapped to the non-volatile memory, if it is determined to write the batch to the non-volatile memory;
writing the batch to the non-volatile memory, if it is determined that the batch is memory-mapped to the non-volatile memory;
sending confirmations of writing the batch to a process associated with each write request in the batch;
determining whether all confirmations of writing the batch have been received;
clearing the batch, if all confirmations of writing the batch have been received;
determining whether any write requests were skipped or stored in a temporary storage; and
looping back to receive a next write request, if it is determined there are no skipped or stored write requests.

63. The method of claim 62 further comprising:
adding an unprocessed write request to a new batch of outstanding requests, if it is determined the outstanding unprocessed write request is in the temporary storage.

64. The method of claim 62 further comprising:
storing the write request in the temporary storage, if it is determined to store the write request in the temporary storage; and
looping back to receive a next write request, if it is determined to skip the write request.

65. The method of claim 62 further comprising:
looping back to receive a next write request, if it is determined not to write the batch to the non-volatile memory.

66. The method of claim 62 further comprising:
memory-mapping the batch with the non-volatile memory before writing the batch to the non-volatile memory, if it is determined the batch is not memory-mapped with the non-volatile memory.

67. The method of claim 62 further comprising:
determining whether to write the stored write request to the non-volatile memory, if it is determined that the stored write request is in the temporary storage.

68. A machine-readable medium having stored thereon a plurality of executable instructions to perform a method comprising:
receiving a write request;
determining whether to add the write request to a batch of outstanding requests;
adding the write request to the batch, if it is determined to add the write request to the batch;
determining whether to write the batch to a non-volatile memory;
determining whether the batch is memory-mapped to the non-volatile memory, if it is determined to write the batch to the non-volatile memory;
writing the batch to the non-volatile memory, if it is determined that the batch is memory-mapped to the non-volatile memory;
sending confirmations of writing the batch to a process associated with each write request in the batch;

determining whether all confirmations of writing the batch have been received;

clearing the batch, if all confirmations of writing the batch have been received;

determining whether any write requests were skipped or stored in a temporary storage; and looping back to receive a next write request, if it is determined there are no skipped or stored write requests.

69. The machine-readable medium of claim 68 wherein the method further comprises:

adding an unprocessed write request to a new batch of outstanding requests, if it is determined the outstanding unprocessed write request is in the temporary storage.

70. The machine-readable medium of claim 68 wherein the method further comprises:

storing the write request in the temporary storage, if it is determined to store the write request in the temporary storage; and looping back to receive a next write request, if it is determined to skip the write request.

71. The machine-readable medium of claim 68 wherein the method further comprises:

looping back to receive a next write request, if it is determined not to write the batch to the non-volatile memory.

72. The machine-readable medium of claim 68 wherein the method further comprises:

memory-mapping the batch with the non-volatile memory before writing the batch to the non-volatile memory, if it is determined the batch is not memory-mapped with the non-volatile memory.

73. The machine-readable medium of claim 68 wherein the method further comprises:

determining whether to write the stored write request to the non-volatile memory, if it is determined that the stored write request is in the temporary storage.

* * * * *